(12) United States Patent
Radovilsky et al.

(10) Patent No.: US 8,610,590 B2
(45) Date of Patent: Dec. 17, 2013

(54) SYSTEM AND METHOD FOR MONITORING ELECTRICAL DEMAND PERFORMANCE, PARTICULARLY USING HISTORICAL DATA AND AN OUTSIDE TEMPERATURE

(75) Inventors: Zinovy Radovilsky, Danville, CA (US); Eugene Gutkin, San Ramon, CA (US); Scott J. St. Germain, Albany, CA (US); Marion Prado, Hayward, CA (US); Eugene Roberov, San Bruno, CA (US); Francisco J. Ruiz, San Ramon, CA (US); Patrick Tsunehiro, San Francisco, CA (US)

(73) Assignee: Intregated Building Solutions, Inc., San Ramon, CA (US)

( * ) Notice: Subject to any disclaimer, the term of this patent is extended or adjusted under 35 U.S.C. 154(b) by 405 days.

(21) Appl. No.: 13/020,683

(22) Filed: Feb. 3, 2011
(Under 37 CFR 1.47)

(65) Prior Publication Data

US 2012/0032814 A1 Feb. 9, 2012

Related U.S. Application Data

(60) Provisional application No. 61/301,313, filed on Feb. 4, 2010.

(51) Int. Cl.
*G08B 21/00* (2006.01)

(52) U.S. Cl.
USPC ............ 340/657; 340/540; 700/276; 700/291

(58) Field of Classification Search
USPC .......... 340/500, 540, 657; 700/276–278, 286, 700/291, 297–300; 702/60
See application file for complete search history.

(56) References Cited

U.S. PATENT DOCUMENTS

| | | | |
|---|---|---|---|
| 5,539,633 A | 7/1996 | Hildebrand et al. | |
| 7,130,719 B2 | 10/2006 | Ehlers et al. | |
| 7,249,043 B1 | 7/2007 | Trout, II et al. | |
| 7,343,226 B2 | 3/2008 | Ehlers et al. | |
| 7,555,364 B2 | 6/2009 | Poth et al. | |
| 2007/0043477 A1* | 2/2007 | Ehlers et al. | 700/276 |

* cited by examiner

*Primary Examiner* — Jeffery Hofsass
(74) *Attorney, Agent, or Firm* — Lewis Kohn & Fitzwilliam LLP; Timothy W. Fitzwilliam

(57) ABSTRACT

A method and associated system for monitoring electrical demand performance in a building, industrial complex or university campus is disclosed. According to a preferred method, historical data is initially complied and statically analyzed to determine demand forecast for a baseline day. Further according to the method, electrical demand is plotted with another indication, more particularly outside air temperature. Additionally the invention provides an electronic alert to building engineers when demand falls outside the expected demand range. Still further a control chart is provided with the expected electrical load range. Outside air temperature is also optionally considered historically and in real time in the method. The invention further contemplates commissioning building engineers to reduce demand when a real time demand is higher than an expected energy demand. A system is also disclosed herein having instrumentation and electronic devices controlled by software and transmitting data.

19 Claims, 2 Drawing Sheets

SYSTEM AND METHOD FOR MONITORING ELECTRICAL DEMAND PERFORMANCE, PARTICULARLY USING HISTORICAL DATA AND AN OUTSIDE TEMPERATURE

PRIORITY CLAIM

This patent application contains subject matter claiming benefit of the priority date of U.S. Provisional Patent Application Ser. No. 61/301,313 filed on Feb. 4, 2010 and entitled, SYSTEM AND METHOD FOR MONITORING ELECTRICAL DEMAND PERFORMANCE, accordingly, the entire contents of this provisional patent application is hereby expressly incorporated by reference.

BACKGROUND OF THE INVENTION

1. Field of the Invention

The present invention relates generally to systems and methods for efficient energy usage and resultant monetary gain. More particularly, in a preferred embodiment, the present invention is a system and method to aid building engineers to effectively manage energy demand and energy sources in commercial and industrial HVAC applications.

2. Description of the Art

Energy producers typically charge customers according to electrical demand (measured in kW hour) and also by a peak demand in a given hour (measured in kW). Energy management is ever more critical for environmentally conscious, cost-effective operation of buildings where heating ventilating and air conditioning (HVAC) systems are employed. Henceforth, many control systems have been introduced to obtain greater control over energy usage. One such innovation was proposed by Hilebrand et al., entitled "Temperature Control Method and Apparatus," U.S. Pat. No. 5,539,633, and was awarded patent protection in 1996. According to Hileband and his co-inventors, it is desirable for HVAC controls to automatically reduce cooling output in response to a predetermined peak demand, as electrical utility cost during an actual peak demand will be at its highest. A drawback to the approach offered by Hileband is that it's difficult to provide the automation desired along with maintaining comfortable temperatures to building occupants.

Another control system has been proposed by Traut, II et al., entitled "Computer Program And Method for Reducing HVAC Demand for Energy," U.S. Pat. No. 7,249,043. According to Traut II, a need exists to enable energy suppliers to more effectively control peak demand situations so that their capacity is not exceeded. The solution proposed aggregates users into a purchasing block and regulates user demand based on energy needs relative to one another. However, this solution for overdemand also provides automation that removes ad hoc control of the electricity consumers.

Additional control systems have been proposed that attempt to provide energy saving automation in HVAC controls, such as "Adaptive Hierarchy Usage Monitoring HVAC Control System," to Poth et al., U.S. Pat. No. 7,555,364. A further example is provided by Ehlers et al, entitled "System and Method of Controlling An HVAC System," U.S. Pat. No. 7,343,226; as well as "System and Method of Controlling An HVAC System," U.S. Pat. No. 7,130,719 also to Ehlers et. al.

As stated herein, managing electrical loads in commercial HVAC applications is ever more important as new rises in energy cost and environmental concerns come forth. Energy customers are still concerned over surcharges that are accessed by power producers during peak demand. Also more expensive electronic equipment, for example, is more abundant in commercial buildings leading to increased electrical demand. While some electrical loads are essentially fixed and cannot be easily controlled, other loads can be effectively managed to maximize efficiency. For example, a chiller having a primary function of making ice, as needed, would optimally be used at night/holidays or weekend where demand is relatively low. Additionally, any systems requiring battery charges should be performed during an off-peak time. Similarly, if batter power can be used during a demand peak to offset actual load, then building engineers should consider this option.

Hence, building engineers are having an ever increasing role in monitoring energy performance to improve efficiency. While many commercial buildings rely solely on the power grid for electrical demand, some building can provide limited power for their own consumption with battery cells, solar cells, natural gas and diesel generators. The alternate energy source is primarily a back up for essential loads in the event the power distribution grid loses power; however the alternative energy sources could be used to offset a peak in electrical demand.

One advantage to monitoring energy demand and performance, as stated herein, is that load shedding may be needed to conserve electricity peak periods. For example, unnecessary loads can be reduced during the early to mid afternoon hours during the sunniest days resulting in reduced energy costs during peak demand. Another advantage to monitoring energy performance is that it could be a first indicator that a certain electrical load, such as an air handling unit, may be in need of periodic maintenance.

In light of the above, it is an object of the present invention to provide a system and method for monitoring energy performance in HVAC applications so that building engineers can respond to projected peak demands and unexpected surges in demand. It is further an object of the present invention to provide a method of collecting historical temperature data in relation to hourly demand and peak demand. It is still further an object of the present invention to provide a software module able to plot real-time energy demand vs. expected energy demand and automatically issue an alert to building engineers of any abnormality.

These, as well as other advantages of the present invention will be more apparent from the following description and drawings. It is understood that changes in the specific structure shown and described may be made within the scope of the claims, without departing from the spirit of the invention.

BRIEF SUMMARY OF THE INVENTION

The present invention specifically addresses and alleviates the above mentioned deficiencies associated with the prior art. More particularly, the present invention in a first aspect, the present invention is a method for monitoring and improving electrical demand performance comprising: compiling historical data, the historical data including a building electrical demand and an outside temperature; obtaining a forecast high temperature for a baseline day; selecting a control group from the historical data and the forecast high temperature for the baseline day; calculating an expected demand range; and providing an alert to building engineers when demand falls outside the expected demand range.

The method for monitoring and improving electrical demand performance in this first aspect is additionally characterized wherein, the compiling historical data further comprises measuring electrical demand, in kilowatts, every hour on the hour; and measuring outside temperature, in degrees Fahrenheit, every hour on the hour.

Additionally the method in the first aspect is also further characterized as comprising the steps of providing a control chart with the expected demand range; plotting hourly electrical demand and hourly outside temperature; and load shedding due to a high electrical demand.

Still further, the method comprises the steps of identifying an average demand kW ($kW_{iavg}$) and a standard deviation of kW ($\sigma_i$) for each hour i from 00:00 to 23:00 further wherein:

$$kW_{iavg} = (kW_{i1} + kW_{i2} + \ldots + kW_{ij})/j$$

$\sigma_i = \text{sqrt}[(\Sigma(kW_{ij} - kW_{iavg})^2/(j-1)]$, where "j" is a number of historical days (j=5); and calculating a peak demand projected range using an upper and a lower limits estimates with a number of standard deviations (z-score) equal to 2 (z=2), further wherein:

$$\text{the upper limit: } kW_i = kW_{iavg} + z * \sigma_i / \text{sqrt}(j)$$

$$\text{the lower limit: } kW_i = kW_{iavg} - z * \sigma_i / \text{sqrt}(j)$$

The method for monitoring and improving electrical demand performance is additionally characterized in that the selecting a control group further comprises selecting five (5) days that have a same or a close match between a historical high temperature and the forecast high temperature.

Yet still further the first preferred method is characterized wherein the method is controlled by software; and further wherein the providing an alert to building engineers when demand falls outside the expected demand range further comprises transmitting and electronic alert to the building engineers. Also a step is included for providing a software enabled electronic device, the electronic device further plotting real-time energy demand vs. expected energy demand.

The method according to the invention is characterized in a second aspect as a method for monitoring electrical demand performance in a building or a plurality of buildings comprising the steps of: compiling historical data, the historical data including a building electrical demand and an outside temperature; obtaining a forecast temperature for a baseline day; selecting a control group from the historical data and the forecast temperature for the baseline day; calculating an expected demand range; and providing an alert to building engineers when demand falls outside the expected demand range.

The method in a second aspect is additionally characterized as comprising the steps of measuring electrical demand, in kilowatts, contemporaneously; and measuring outside temperature, in degrees Fahrenheit, contemporaneously. Also a step is added that considers outside air temperature historically, and additionally in real time, and further in a forecast of outside air temperature. Alternatively, five (5) days are selected historically.

The method in this aspect is further characterized as comprising:

identifying an average demand kW ($kW_{iavg}$) and a standard deviation of kW ($\sigma_i$) for each i associated with a particular time of day wherein:

$$kW_{iavg} = (kW_{i1} + kW_{i2} + \ldots + kW_{ij})/j$$

$\sigma_i = \text{sqrt}[(\Sigma(kW_{ij} - kW_{iavg})^2/(j-1)]$, where "j" is a number of historical days (j=5); and calculating a peak demand projected range using an upper and a lower limits estimates with a number of standard deviations (z-score) equal to 2 (z=2), further wherein:

$$\text{the upper limit: } kW_i = kW_{iavg} + z * \sigma_i / \text{sqrt}(j)$$

$$\text{the lower limit: } kW_i = kW_{iavg} + z * \sigma_i / \text{sqrt}(j)$$

The method is the second aspect further comprises the steps of providing instrumentation and data associated therewith; providing a first electronic device; providing a second electronic device; transmitting the data from the first electronic to the second electronic device; and controlling the first electronic device or the second electronic device with software. Also included in the method is commissioning the building engineers to reduce demand when a real time demand is higher than an expected energy demand.

In still a third aspect, another preferred embodiment is characterized as a system for monitoring and improving electrical demand performance in a building or a network of buildings, the network of buildings further comprising areas and sub-area, the system comprising: instrumentation and data measured by the instrumentation; a first electronic device; a second electronic device, the first electronic device further comprising a transmitter, where the data is communicated from the first electronic to the second electronic device; and software providing indication and control to the system herein.

The system herein for monitoring and improving electrical demand performance in a building is further characterized as comprising: historical data, the historical data including a building electrical demand and an outside temperature; a forecast high temperature for a baseline day; a control group associated to the historical data and the forecast high temperature for the baseline day; an expected demand range calculated from the historical data and the forecast high temperature; and an electronic alert, the electronic alert provided by the transmitter to building engineers when demand falls outside the expected demand range.

The system according to this aspect of the invention is additionally characterized wherein the software instructs either the first electronic device or the second electronic device to compile the historical data. Yet still further the system further comprises a control chart with the expected demand range, and further wherein the data further comprises an hourly electrical demand; and an hourly outside temperature.

Yet further, the system is characterized wherein an average demand kW ($kW_{iavg}$) and a standard deviation of kW ($\sigma_i$) for each hour i from 00:00 to 23:00 is measured and further wherein:

$$kW_{iavg} = (kW_{i1} + kW_{i2} + \ldots + kW_{ij})/j$$

$\sigma_i = \text{sqrt}[(\Sigma(kW_{ij} - kW_{iavg})^2/(j-1)]$, where "j" is a number of historical days (j=5); and the expected demand range further has an upper and a lower limit estimate with a number of standard deviations (z-score) equal to 2 (z=2) is calculated, further wherein:

$$\text{the upper limit: } kW_i = kW_{iavg} + z * \sigma_i / \text{sqrt}(j)$$

$$\text{the lower limit: } kW_i = kW_{iavg} - z * \sigma_i / \text{sqrt}(j)$$

is additionally calculated

Lastly, the system for monitoring and improving electrical demand performance in a building is additionally characterized wherein five (5) days that have a same or a close match between a historical high temperature and a forecast high temperature are selected.

These, as well as other advantages of the present invention will be more apparent from the following description and drawings. It is understood that changes in the specific structure shown and described may be made within the scope of the claims, without departing from the spirit of the invention.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION OF PREFERRED EMBODIMENTS

Figure 1A:
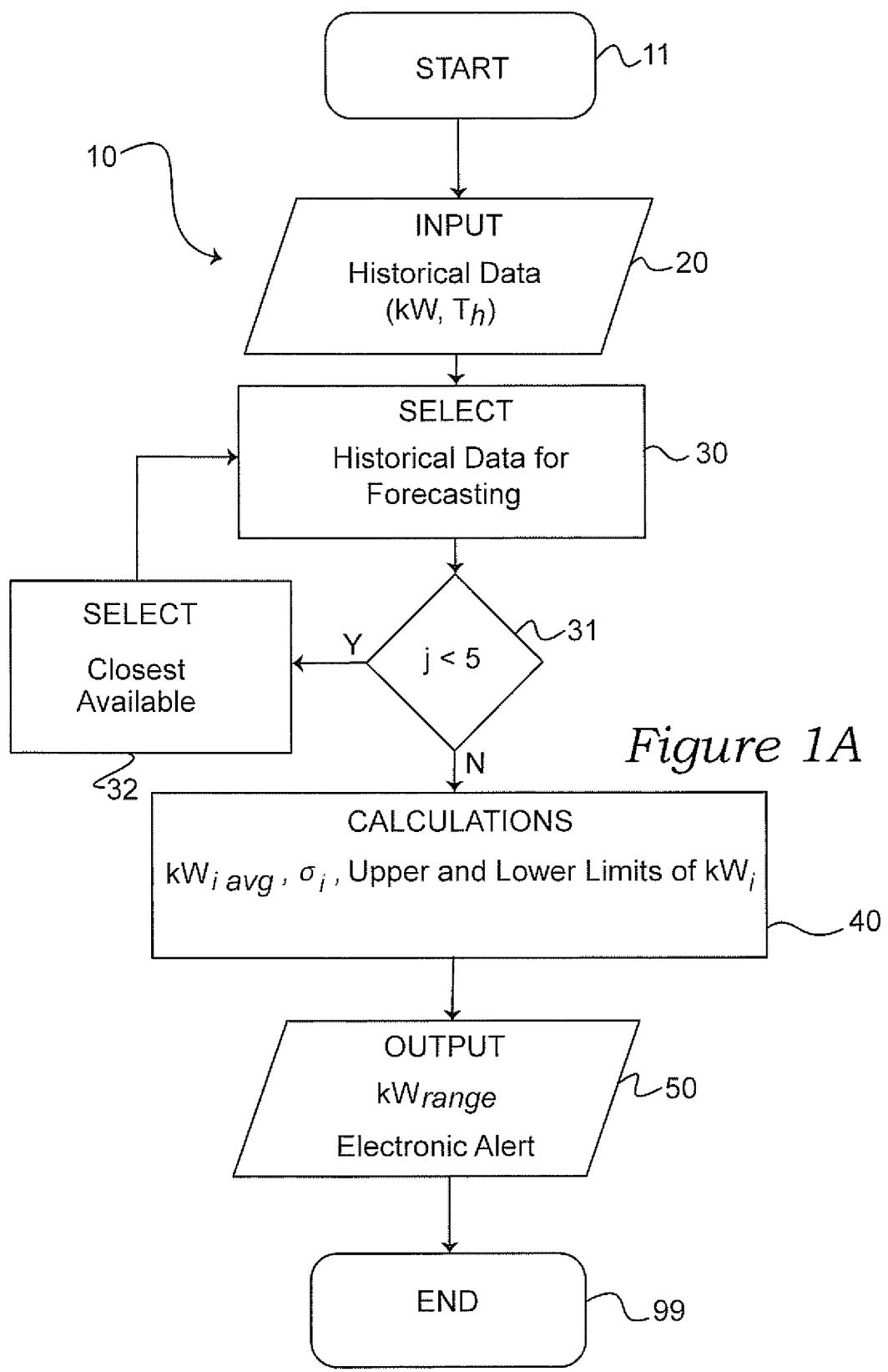
FIG. 1A is an overview flow chart depicting a preferred method of the present invention.

With regard to FIG. 1A, an overview diagram depicting a preferred flow process 10 of the present invention is illustrated. Generally, the method 10 attempts to first 11 gather historical temperature and electrical demand data 20 for statistical analysis 30, 40. More particularly, hourly electrical demand (kW-h) and peak demand (kW) during the hour against outside temperature is gathered to a historical database 30. Next, a baseline demand forecast 30 for a baseline day is calculated to determine a projected range in demand 40. Eventually, the projected range is compared to a plot 50 of actual hourly demand and also actual hourly temperature as explained in more detail herein.

Figure 1B:
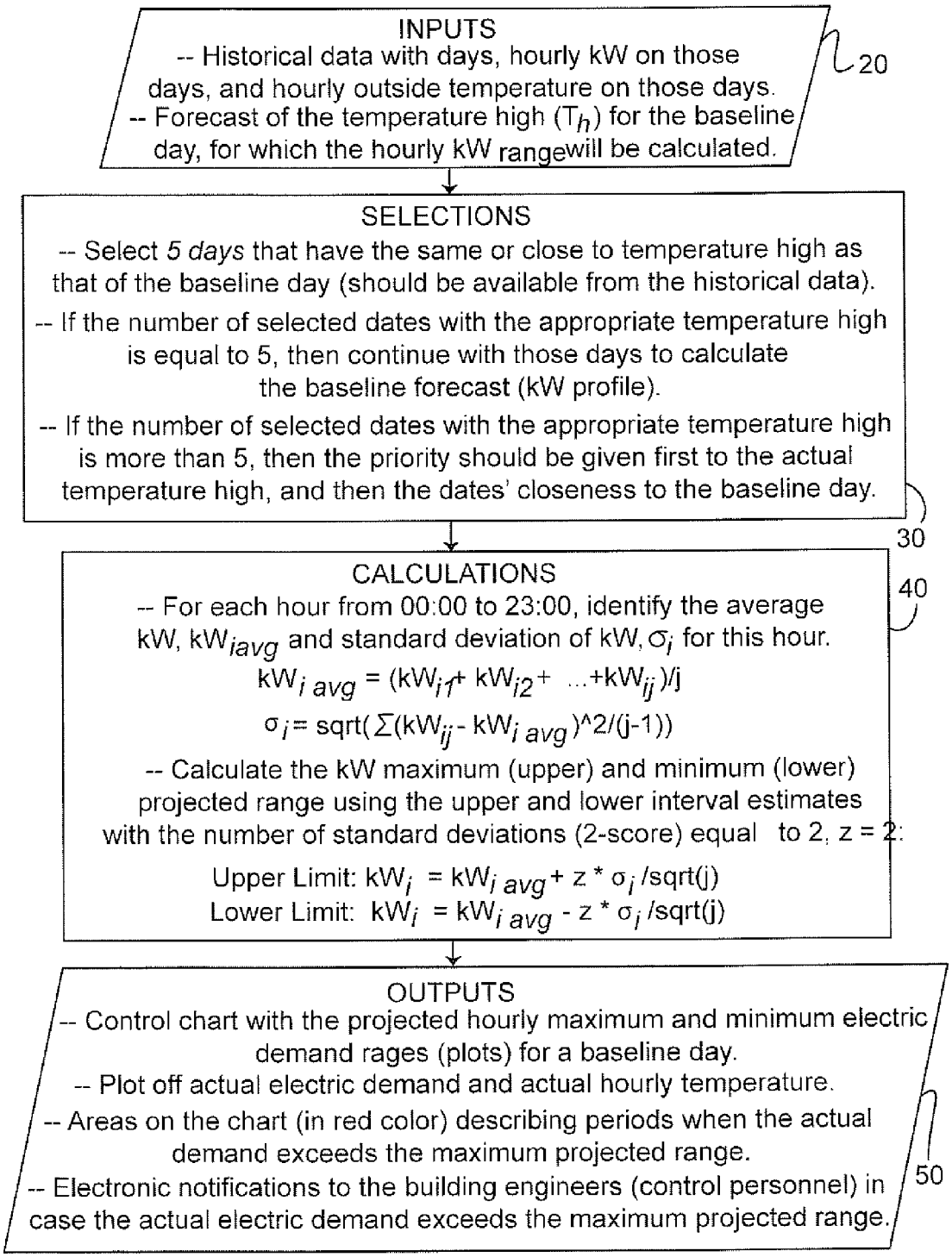
FIG. 1B is a more detailed flow chart further depicting the preferred method.

For calculating 40 a projected range in peak demand, as illustrated in FIG. 1A and in FIG. 1B, the first step is to select 30 five (5) days 31, historically, that have the same or close to the same temperature high as the forecast high temperature for that baseline day. Next, if the number of selected dates with the appropriate forecast temperature high is equal to five (5) 31, then the method 10 should continue using just those days to calculate the baseline forecast demand range (kW profile). Alternatively, if the number of selected dates with the appropriate temperature high is more than five (5), then priority 32 is given first to exact matches of the high temperature and subsequently priority is given to dates with the closest actual high to the baseline day.

From the historical data 20 from the days selected 30, the next method step is to identify the average 40 demand kW ($kW_{iavg}$) and the standard deviation of kW ($\sigma_i$) for each hour i from 00:00 to 23:00 as follows:

$kW_{iavg} = (kW_{i1} + kW_{i2} + \ldots + kW_{ij})/j$ $\sigma_i = \text{sqrt}[(\Sigma(kW_{ij} - kW_{iavg})^2/(j-1)]$, where "j" is a number of historical days (j=5).

The next step in the preferred method is to calculate 40 the peak demand kW maximum (upper) and minimum (lower) projected ranges ($kW_{range}$) the upper and lower interval estimates with the number of standard deviations (z-score) equal to 2 (z=2):

Upper Limit: $kW_i = kW_{iavg} + z \cdot \sigma_i / \text{sqrt}(j)$

Lower Limit: $kW_i = kW_{iavg} - z \cdot \sigma_i / \text{sqrt}(j)$

The next step in the preferred method is to plot 50 a control chart with the projected hourly maximum and minimum electric demand ranges for the baseline day. After this, the method 10 will plot actual hourly electrical demand and actual hourly outside temperature as measured from an outside building thermometer or a nearby weather station. The method 10 herein is further characterized in that alert areas on the control chart are provided in red describing when the actual demand exceeds the maximum projected range.

Numerous benefits and advantages 99 of the present invention 10 will further be appreciated by the skilled artisan and include providing an on-going commissioning of energy awareness further providing real-time energy notifications for buildings engineers leading to more efficient energy usage. Hence, the building engineers or technicians can immediately respond 50 to deviations from normal operations with real-time energy alerts and automated work order creation. Further, building engineers can manage power according to the invention by putting on-line or off-line any energy sources that do not come from the standard electrical grid such as back up battery power, auxiliary generators, natural gas, solar panels, and fuel cells.

In another aspect of the present invention 10, energy demand can be divided by the subarea and can be managed and monitored by the subarea to include data centers, warehouse, and cafeterias, or simply by the building floor. Also, building engineers could perform load shedding of major HVAC or other equipment in response to a high demand peak.

Many alterations and modifications may be made by those having ordinary skill in the art without departing from the spirit and scope of the invention. Therefore, it must be understood that the illustrated embodiments have been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

While the particular System and Method for Monitoring Electrical Demand Performance as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

What is claimed is:

1. A method for monitoring and improving electrical demand performance comprising:
    compiling historical data, the historical data including a building electrical demand and an outside temperature;
    obtaining a forecast high temperature for a baseline day;
    selecting a control group from the historical data and the forecast high temperature for the baseline day;
    calculating an expected demand range; and
    providing an alert to building engineers when demand falls outside the expected demand range.

2. The method for monitoring and improving electrical demand performance of claim 1, the compiling historical data further comprising:
  measuring electrical demand, in kilowatts, every hour on the hour; and
  measuring outside temperature, in degrees Fahrenheit, every hour on the hour.

3. The method for monitoring and improving electrical demand performance of claim 1, further comprising:
  providing a control chart with the expected demand range;
  plotting hourly electrical demand and hourly outside temperature; and
  load shedding due to a high electrical demand.

4. The method for monitoring and improving electrical demand performance of claim 1, the calculating an expected demand range further comprising:
  identifying an average demand kW ($kW_{i\ avg}$) and a standard deviation of kW ($\sigma_i$) for each hour i from 00:00 to 23:00 further wherein:

$$kW_{iavg}=(kW_{i1}+kW_{i2}+\ldots+kW_{ij})/j$$

$\sigma_i$=sqrt$[(\Sigma(kW_{ij}-kW_{iavg})^2/(j-1)]$, where "$j$" is a number of historical days ($j32\ 5$); and
  calculating a peak demand projected range using an upper and a lower limits estimates with a number of standard deviations (z-score) equal to 2 (z =2), further wherein:

the upper limit: $kW_i=kW_{iavg}+z*\sigma_i/\text{sqrt}(j)$ the lower limit: $kW_i=kW_{iavg}-z*\sigma_i/\text{sqrt}(j)$.

5. The method for monitoring and improving electrical demand performance of claim 1, the selecting a control group further comprising selecting five (5) days that have a same or a close match between a historical high temperature and the forecast high temperature.

6. The method for monitoring and improving electrical demand performance of claim 1, wherein the method is controlled by software and further wherein the providing an alert to building engineers when demand falls outside the expected demand range further comprises transmitting and electronic alert to the building engineers.

7. The method for monitoring and improving electrical demand performance of claim 1, further comprising providing a software enabled electronic device, the electronic device further plotting real-time energy demand vs. expected energy demand.

8. A method for monitoring electrical demand performance in a building or a plurality of buildings comprising:
  compiling historical data, the historical data including a building electrical demand and an outside temperature;
  obtaining a forecast temperature for a baseline day;
  selecting a control group from the historical data and the forecast temperature for the baseline day;
  calculating an expected demand range; and
  providing an alert to building engineers when demand falls outside the expected demand range.

9. The method for monitoring and improving electrical demand performance of claim 8, the compiling historical data further comprising:
  measuring electrical demand, in kilowatts, contemporaneously; and
  measuring outside temperature, in degrees Fahrenheit, contemporaneously.

10. The method for monitoring and improving electrical demand performance of claim 8, further comprising considering outside air temperature historically, in real time, and in a forecast thereof.

11. The method for monitoring and improving electrical demand performance of claim 8, the calculating an expected demand range further comprising:
  identifying an average demand kW ($kW_{i\ avg}$) and a standard deviation of kW ($\sigma_i$) for each i associated with a particular time of day wherein:

$$kW_{iavg}=(kW_{i1}+kW_{i2}+\ldots+kW_{ij})/j$$

$\sigma_i$=sqrt$[(\Sigma(kW_{ij}-kW_{iavg})^2/(j-1)]$, where "$j$" is a number of historical days ($j=5$); and
  calculating a peak demand projected range using an upper and a lower limits estimates with a number of standard deviations (z-score) equal to 2 (z =2), further wherein:

the upper limit: $kW_i=kW_{iavg}+z*\sigma_i/\text{sqrt}(j)$ the lower limit: $kW_i=kW_{iavg}-z*\sigma_i/\text{sqrt}(j)$.

12. The method for monitoring and improving electrical demand performance of claim 8, the selecting the control group further comprising selecting five (5) days that have a same or a close match between a historical temperature and the forecast temperature.

13. The method for monitoring and improving electrical demand performance of claim 8, further comprising:
  providing instrumentation and data associated therewith;
  providing a first electronic device;
  providing a second electronic device;
  transmitting the data from the first electronic to the second electronic device; and
  controlling the first electronic device or the second electronic device with software.

14. The method for monitoring and improving electrical demand performance of claim 8, commissioning the building engineers to reduce demand when a real time demand is higher than an expected energy demand.

15. A system for monitoring and improving electrical demand performance in a building or a network of buildings, the network of buildings further comprising areas and sub-area, the system comprising:
  instrumentation and data measured by the instrumentation;
  a first electronic device;
  a second electronic device, the first electronic device further comprising a transmitter, where the data is communicated from the first electronic to the second electronic device;
  historical data, the historical data including a building electrical demand and an outside temperature; and
  software providing indication and control to the system herein, wherein the software instructs either the first electronic device or the second electronic device to compile the historical data.

16. The system for monitoring and improving electrical demand performance in a building of claim 15, further comprising:
  a forecast high temperature for a baseline day;
  a control group associated to the historical data and the forecast high temperature for the baseline day;
  an expected demand range calculated from the historical data and the forecast high temperature; and
  an electronic alert, the electronic alert provided by the transmitter to building engineers when demand falls outside the expected demand range.

17. The system for monitoring and improving electrical demand performance in a building of claim 16, further comprising a control chart with the an expected demand range, and further wherein the data further comprises an hourly electrical demand; and an hourly outside temperature.

18. The system for monitoring and improving electrical demand performance in a building of claim 15, further comprising:

an average demand kW ($kW_{i\ avg}$) and a standard deviation of kW ($\sigma_i$) for each hour i from 00:00 to 23:00 further wherein:

$kW_{iavg} = (kW_{i1} + kW_{i2} + \ldots + kW_{ij})/j$ $\sigma_i = \mathrm{sqrt}[(\Sigma(kW_{ij} - kW_{iavg})^2/(j-1)]$, where "$j$" is a number of historical days ($j=5$); and the expected demand range further comprising an upper and a lower limit estimate with a number of standard deviations (z-score) equal to 2 (z =2), further wherein:

the upper limit: $kW_i = kW_{iavg} + z*\sigma_i/\mathrm{sqrt}(j)$ the lower limit: $kW_i = kW_{iavg} - z*\sigma_i/\mathrm{sqrt}(j)$.

19. The system for monitoring and improving electrical demand performance in a building of claim 15, further comprising five (5) days that have a same or a close match between a historical high temperature and a forecast high temperature.

* * * * *

UNITED STATES PATENT AND TRADEMARK OFFICE
CERTIFICATE OF CORRECTION

PATENT NO. : 8,610,590 B2
APPLICATION NO. : 13/020683
DATED : December 17, 2013
INVENTOR(S) : Radovilsky et al.

It is certified that error appears in the above-identified patent and that said Letters Patent is hereby corrected as shown below:

Title page, item (57) Abstract, line 4: after the word "initially" should read the word "compiled";

Title page, item (57) Abstract, line 4: after the word "and" should read the word "statistically";

In the Drawings:

Figure 1B, reference character 30, last line: after the word "dates" should read the word "closest";

Figure 1B, reference character 50, second line: after the word "demand" should read the word "ranges";

In the Specification:

Column 2, line 9: replace the word "batter" with the word "battery";

Column 2, line 15: replace the word "building" with the word "buildings";

Column 2, line 24: insert the word --during-- between the word "electricity" and the word "peak";

Column 2, line 52: following the first ",", delete the words "the present invention";

Column 3, line 14: replace the word "limits" with the word "limit";

Column 3, line 14: replace the word "estimates" with the word "estimate";

Column 3, line 29: replace the word "and" with the word "an";

Column 3, line 62: replace the word "limits" with the word "limit";

Column 3, line 62: replace the word "estimates" with the word "estimate";

Signed and Sealed this
Eleventh Day of March, 2014

Michelle K. Lee
*Deputy Director of the United States Patent and Trademark Office*

Column 3, line 67: replace the "+" sign with a "-" sign;

Column 4, line 1: replace the word "is" with the word "in";

Column 4, line 4-5: insert the word --device-- between the words "electronic" and "to";

Column 4, line 17: insert the word --device-- between the words "electronic" and "to";

Column 4, line 53: insert a --.-- following the word "calculated";

Column 7, line 23: replace "32" with "=" to read "j=5" in parentheses;

Column 7, line 25: replace the word "limits" with the word "limit";

Column 7, line 25: replace the word "estimates" with the word "estimate";

Column 7, line 40: replace the word "and" with the word "an";

Column 8, line 28: insert the word --device-- between the words "electronic" and "to";

Column 8, line 33: insert the words --further comprising-- before the word "commissioning";

Column 8, line 38-39: replace the word "sub-area" with the word "sub-areas";

Column 8, line 44: insert the word --device-- between the words "electronic" and "to"; and Column 8, line 65: delete the word "an".